April 13, 1965                 R. H. DAWSON ET AL                    3,178,531
                                  PRESSURE SWITCH
                                Filed July 25, 1962
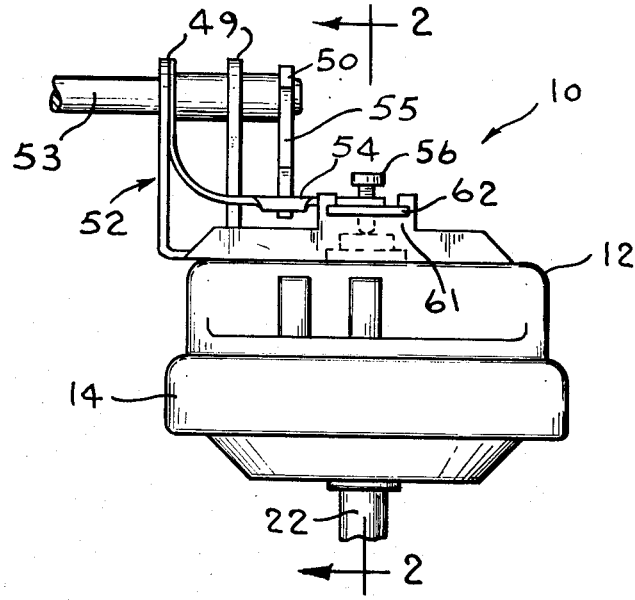
FIG. 1
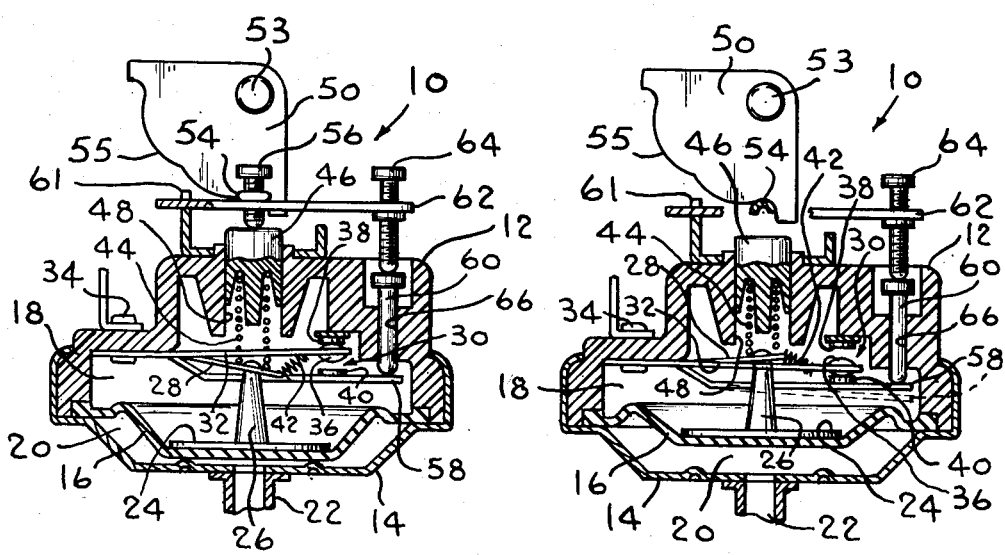
FIG. 2                                    FIG. 3
INVENTORS
ROBERT H. DAWSON
HENRY W. JOHANSEN
BY
Bayard H. Michael
ATTORNEY

United States Patent Office 3,178,531
Patented Apr. 13, 1965

3,178,531
PRESSURE SWITCH
Robert H. Dawson, Lake Bluff, and Henry W. Johansen, Chicago, Ill., assignors to Controls Company of America, Schiller Park, Ill., a corporation of Delaware
Filed July 25, 1962, Ser. No. 212,254
10 Claims. (Cl. 200—83)

This invention relates to pressure sensitive switch devices and particularly to an improved control for varying the pressure differential between the switch-on and switch-off pressures for the electric switch.

Pressure switch devices of the type contemplated herein are used to control the electric switches which regulate the flow of water into a washing machine to automatically effect filling of the machine to a preselected water level. On reaching the selected high water level, the electric switch is moved from a switch-off position to a switch-on position to stop the flow of water into the machine and to resume the selected cycle of operation. When the water is drained from the washing machine, the electric switch is moved from the switch-on to the initial switch-off position at some predetermined low water level to again resume the cycle of operation. The low water level for moving the switch from the switch-on to the switch-off position is normally predetermined at some fixed water level or at some constant differential from the preselected water level.

The primary object of this invention is to provide an improved control for varying the pressure differential between the high water level and the low water level at some predetermined proportion of the high water level.

This object is accomplished by modifying a pressure switch device of the type having an electric switch that is tripped by the motion of a pressure responsive flexible diaphragm. A calibrating spring acts against the diaphragm and determines the pressure or water level necessary to trip the switch. A manually movable selector cam is used to vary the force of the calibrating spring acting on the flexible diaphragm. The force of the calibrating spring acting on the diaphrgam determines the high water level in the machine. The low water level is determined by a secondary lever and plunger arrangement that is operatively connected to the selector cam to vary the position of the switch-on contact within the switch device thereby changing the pressure required to reset the electric switch at a constant proportion of the high water level.

Other objects and advantages will be pointed out in or be apparent from the specification and claims, as will obvious modifications of the single embodiment shown in the drawings in which:

FIG. 1 is a side view of the pressure switch showing the selector cam and secondary lever arrangement;

FIG. 2 is a front sectional view showing the switch in the switch-off position; and FIG. 3 is a view similar to FIG. 2 showing the switch in the switch-on position.

Referring more specifically to the drawings, pressure switch device 10 has a cup-type insulating housing 12 having its open end enclosed by a closely fitting metal cover 14. A resilient diaphragm 16 has its outer edge clamped between the cover and the housing to define an upper switch chamber 18 and a lower pressure chamber 20. An inlet passage 22 is provided in the cover and is adapted to be connected to a pressure source such as the water receptacle in a washing machine.

A diaphragm pad 24 is mounted on the central portion of the diaphragm and supports a switch actuator 26 which projects upwardly in the switch chamber and is tapered to pass through a slot in toggle blade 28 on electric switch 30. The electric switch is of the overcenter snap switch type having a contact arm 32 secured at one end to the housing by terminal rivet 34. A common contact 36 is mounted on the movable end of the contact arm for movement between switch-off contact 38 and switch-on contact 40. The construction and operation of switches of this type is well known and can briefly be described as requiring the movement of the toggle blade past the plane of the contact carrying arm to reverse the force of the toggle spring 42 to thereby trip the switch moving the contact carrying arm from one contact into engagement with the other.

The motion of the diaphragm is resisted by calibrating spring 44 that is compressed between the upper end of the switch acuator and plunger 46 slidably mounted in hole 48 in the housing. The position of the plunger with respect to the housing determines the amount of spring force acting on the diaphragm and, as a consequence, the pressure of the water level required to trip the switch. The position of the plunger within the housing is varied by manually rotating cam 50 which acts on the plunger through lever arm 54. The selector cam is secured to shaft 53 which is rotatably mounted in upstanding arms 49 in bracket 52 secured to the top of the housing. The selector cam has a peripheral cam surface 55 that engages and determines the position of the lever arm. The lever arm has one end secured to the bracket and is biased into engagement with the cam surface on the selector cam. An adjusting screw 56 is mounted on the other end of the lever arm and is positioned to engage the top of the plunger. The cam surface on the selector cam has a number of dwells indicating low, medium, and high water levels and provide a positive feel when the cam is rotated, the detent action of the lever arm acting against the selector cam.

When water is drained from the washing machine, the snap switch will reset to its initial position when the toggle blade passes the plane of the switch arm. In the present structure the switch-on contact is mounted near one end of resilient arm 58 that has its opposite end secured to the housing. The position of the switch-on contact with respect to the housing is varied in response to changes in the setting of the selector cam by means of a second plunger 60 and a second lever arm 62. The second lever arm is pivotally mounted on arm 61 on the bracket and carries an adjusting screw 64 on the other end which operatively engages the plunger. The plunger projects through hole 66 in the housing and operatively engages the end of resilient arm 58 which is biased to follow the motion of the plunger. The end of the first lever arm engages the second lever arm to move the second plunger a predetermined amount for each setting of the selector cam. The lengths of the lever arms are designed to provide a predetermined rate of variation in the pressure differential between the high water level and the low water level for each setting of the selector cam. The lengths of the lever arms determine the rate of change in the setting of the plungers. As an example, with a two-to-one relation in the movement of the lever arms a setting for twelve inches of water in the machine would provide six inches of water at the low water level, the pressure differential being six inches. On resetting of the selector cam to provide eighteen inches of water, the low water level setting would be nine inches and the head pressure differential would now be nine inches. The low water level would always be one-half of the high water level. The low water level can be set for any proportion of the high water level by the arrangement of the lever arms.

Although but one embodiment of the present invention has been illustrated and described, it will be ap-

We claim:
1. A pressure responsive device comprising,
a housing including a pressure responsive means,
switch means operatively connected to the pressure responsive means and movable from a first position to a second position in accordance with movement of said pressure responsive means,
manually selectable means for preselecting the pressure required to actuate the switch means from the first position to the second position,
and second means responsive to the setting of the selectable means for determining the pressure required to actuate the switch means from the second position to the first position.

2. A pressure responsive device according to claim 1 wherein the second means is operative to vary the pressure required to actuate the switch means from the second position to the first position at a constantly varying differential of the pressure required to actuate the switch from the first position to the second position for each setting of said selectable means.

3. A pressure responsive device comprising,
a housing including a diaphragm adapted to respond to variations in pressure on one side of the diaphragm,
a switch, means operatively connecting said switch to the diaphragm for movement from a switch-off to a switch-on position in response to a predetermined pressure acting on the diaphragm,
manually selectable means for adjusting the pressure required to move the switch from the switch-off to the switch-on position,
and second means responsive to said manually selectable means for adjusting the pressure required to move the switch from the switch-on to the switch-off position at a constantly varying differential with respect to the pressure required to move the switch from the switch-off to the switch-on position for each setting of the selectable means.

4. A pressure responsive device according to claim 3 wherein said second means is operatively engaged by the manually selectable means.

5. A pressure responsive device comprising,
a housing,
a flexible member dividing the housing into a pressure chamber and a switch chamber,
said flexible member moving in response to the pressure in the pressure chamber,
a snap switch mounted in the switch chamber and connected to respond to the motion of the flexible member,
said snap switch comprising a contact carrying arm movable between a first contact and a second contact,
selectively adjustable spring means for varying the pressure required to move the contact carrying arm from the first contact to the second contact,
and lever means connected to the selectively adjustable spring means and the second contact for varying the pressure required to move the contact carrying arm from the second contact to the first contact at a predetermined percentage of the pressure required to move the arm from the first contact to the second contact.

6. A pressure responsive device comprising,
a housing,
a pressure responsive diaphragm positioned within said housing,
snap switch means positioned within said housing,
said switch means being movable between a fixed contact and a movable contact,
switch actuating means for transferring the motion of the pressure responsive diaphragm to the snap switch means,
adjustable spring means for determining the pressure required to move the snap switch from the fixed contact into engagement with the movable contact,
and lever means connecting the adjustable spring means with the movable contact to vary the position of the movable contact whereby the pressure required to move the switch from the fixed contact to the movable contact is a constant proportion of the pressure required to move the switch means from the movable contact to the fixed contact.

7. A pressure responsive device according to claim 6 wherein said adjustable spring means includes a plunger, a compression spring positioned between the plunger and the switch blade and a cam actuated lever system for moving the plunger to compress the spring, the compressive force of the spring determining the pressure required to move the switch from the movable contact into engagement with the fixed contact.

8. A pressure responsive device according to claim 7 wherein said lever means includes a second lever and a plunger positioned between the second lever and the movable contact, said second lever being connected to respond to the motion of the cam actuated lever system.

9. A pressure actuated switch mechanism comprising,
a housing,
a diaphragm dividing the housing into a pressure chamber and a switch chamber,
a switch actuator responsive to the motion of the diaphragm,
adjustable spring means acting on the actuator in opposition to the motion of the diaphragm,
snap switch means actuated by the motion of the actuator,
said switch means comprising a switch blade movable between a fixed contact and a movable contact,
and lever actuated plunger means operatively connected to the movable contact and the adjustable spring means to vary the position of the movable contact in accordance with changes in the biasing force of the adjustable spring means whereby the pressure acting on the diaphragm necessary to move the switch blade from the fixed contact into engagement with the movable contact is a proportion of the pressure required to move the switch blade from the movable contact into engagement with the fixed contact.

10. A pressure responsive switch device comprising, in combination,
a housing,
a pressure responsive diaphragm mounted in and dividing said housing into a pressure chamber and a switch chamber and being movable in accordance with variations in pressure in said pressure chamber,
adjustable switch means in said switch chamber and connected to said pressure responsive diaphragm for movement therewith between high and low pressure operating positions corresponding to high and low pressure positions of said pressure responsive means,
spring means connected to and biasing said switch means and diaphragm toward a low pressure position,
first lever means connected to spring means and mounted for movement to vary the biasing force of said spring and thereby adjust the pressure at which said diaphragm and switch means assume said high pressure positions,
means connected to and operative to selectively move said first lever means to vary said biasing force,
second lever means connected to said first lever means and movable in response to movement of said first lever means to vary said biasing force,
and means connecting said second lever means to said switch means and operative to transmit said movement of said second lever to said switch means for varying the low pressure position of said switch means so that the pressures at which said switch means assumes said high and low pressure positions maintain a predetermined proportional relationship in accordance with the ratio of the lever arms of said first and second lever means.

References Cited by the Examiner
UNITED STATES PATENTS
2,755,362   7/56   Jacobs _____ 200—83

BERNARD A. GILHEANY, *Primary Examiner.*